(12) United States Patent  
Goddard

(10) Patent No.: US 8,214,906 B2  
(45) Date of Patent: Jul. 3, 2012

(54) SYSTEM, METHOD AND PROGRAM PRODUCT TO DETERMINE SECURITY RISK OF AN APPLICATION

(75) Inventor: James P. Goddard, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 1854 days.

(21) Appl. No.: 10/690,017

(22) Filed: Oct. 21, 2003

(65) Prior Publication Data

US 2005/0086530 A1     Apr. 21, 2005

(51) Int. Cl.
    *G06F 11/00*     (2006.01)
(52) U.S. Cl. .................. 726/25; 726/22; 726/23; 726/24
(58) Field of Classification Search .................. 726/1, 23
    See application file for complete search history.

(56) References Cited

U.S. PATENT DOCUMENTS

| | | | |
|---|---|---|---|
| 5,727,155 A * | 3/1998 | Dawson ....................... | 709/205 |
| 6,219,805 B1 * | 4/2001 | Jones et al. ..................... | 714/38 |
| 6,289,462 B1 | 9/2001 | McNabb et al. .............. | 713/201 |
| 6,374,358 B1 * | 4/2002 | Townsend ......................... | 726/1 |
| 7,007,026 B2 * | 2/2006 | Wilkinson et al. ............. | 707/10 |
| 7,552,480 B1 * | 6/2009 | Voss ................................ | 726/25 |
| 2002/0147803 A1 | 10/2002 | Dodd et al. .................... | 709/223 |
| 2002/0188861 A1 | 12/2002 | Townsend ..................... | 713/200 |
| 2003/0046128 A1 | 3/2003 | Heinrich ............................ | 705/7 |
| 2003/0056116 A1 | 3/2003 | Bunker et al. ................ | 713/201 |
| 2003/0065929 A1 * | 4/2003 | Milliken ........................ | 713/189 |
| 2003/0114144 A1 * | 6/2003 | Minemura ..................... | 455/410 |
| 2003/0140238 A1 * | 7/2003 | Turkboylari ................... | 713/193 |
| 2003/0140250 A1 | 7/2003 | Taninaka et al. .............. | 713/201 |
| 2003/0154269 A1 | 8/2003 | Nyanchama et al. .......... | 709/223 |
| 2003/0210139 A1 * | 11/2003 | Brooks et al. ................. | 340/531 |
| 2004/0193907 A1 * | 9/2004 | Patanella ....................... | 713/200 |
| 2004/0230835 A1 * | 11/2004 | Goldfeder et al. ............ | 713/201 |
| 2005/0065941 A1 * | 3/2005 | DeAngelis et al. ........... | 707/100 |
| 2005/0080720 A1 * | 4/2005 | Betz et al. ........................ | 705/38 |
| 2006/0117388 A1 * | 6/2006 | Nelson et al. ................... | 726/25 |

OTHER PUBLICATIONS

IBM TDB No. NNRD453135 "Business Method of Using Host Based Health Checking and Vulnerability Mitigation" Jan 2002.*

* cited by examiner

*Primary Examiner* — Nasser Goodarzi  
*Assistant Examiner* — Daniel Hoang  
(74) *Attorney, Agent, or Firm* — Arthur J. Samodovitz

(57) ABSTRACT

A system, method and program product for evaluating a security risk of an application. A determination is made whether unauthorized access or loss of data maintained or accessed by the application would cause substantial damage. A determination is made whether the application is shared by different customers. A determination is made whether a vulnerability in the application can be exploited by a person or program which has not been authenticated to the application or a system in which the application runs. A numerical value or weight is assigned to each of the foregoing determinations. Each of the numerical values or weights corresponds to a significance of the determination in evaluating said security risk. The numerical values or weights are combined to evaluate the security risk. Other factors can also be considered in evaluating the security risk.

10 Claims, 4 Drawing Sheets

SYSTEM, METHOD AND PROGRAM PRODUCT TO DETERMINE SECURITY RISK OF AN APPLICATION

BACKGROUND OF THE INVENTION

The invention relates generally to computer systems, and deals more particularly with a technique to determine a security risk of a software application.

Every software application poses some security risk. The risks include unauthorized access, attack by hackers, computer viruses and worms, loss or corruption of data, loss of availability to data or the application and theft of proprietary or personal data. The vulnerabilities can be caused by programming errors, configuration problems or application design errors. Often, IT organizations will undergo a certification process to ensure that an application being considered for deployment meets some minimum standards for IT security. Known certification processes comprise some form of design review, security technical testing, and risk analysis based on the results of the design review and testing. The known certification process may also balance security risks with business needs, and to some extent is subjective.

There is an existing standard, NIST 800-37, for certifying applications used for the US government. This standard comprises guidelines for certifying and accrediting information systems that support the executive agencies of the U.S. Federal government.

An object of the present invention is to provide a system, method and program product for determining if a software application is sufficiently secure, under the circumstances and considering the business needs, to be deployed.

Another object of the present invention is to provide a system, method and program product of the foregoing type which is more objective than other known certification processes.

SUMMARY OF THE INVENTION

The invention resides in a system, method and program product for evaluating a security risk of an application. A determination is made whether unauthorized access or loss of data maintained or accessed by the application would cause substantial damage. A determination is made whether the application is shared by different customers. A determination is made whether a vulnerability in the application can be exploited by a person or program which has not been authenticated to the application or a system in which the application runs. A numerical value or weight is assigned to each of the foregoing determinations. Each of the numerical values or weights corresponds to a significance of the determination in evaluating said security risk. The numerical values or weights are combined to evaluate the security risk.

The invention also resides in another system, method and program product for a security risk of an application. A determination is made whether unauthorized access or loss of the data would cause substantial damage. A determination is made whether the application is vulnerable to attack by a third party. A determination is made whether the application is shared by different customers. A determination is made as to mitigation controls for the security risk of the application. A numerical value or weight is assigned to each of the foregoing determinations. Each of the numerical values or weights corresponds to a significance of the determination in evaluating the security risk.

A computer program product for evaluating a security risk of an application, said computer program product comprising: a computer readable medium; first program instructions to receive user input as to whether unauthorized access or loss of said data would cause substantial damage, whether said application is vulnerable to attack by a third party, whether the application is shared by different customers, and mitigation controls for the security risk of said application; and second program instructions to assign a numerical value or weight to each of the foregoing determinations, each of said numerical values or weights corresponding to a significance of the determination in evaluating said security risk, and combine the numerical values or weights to evaluate the security risk; and wherein said first and second program instructions are recorded on said medium.

A computer program product for evaluating a security risk of an application, said computer program product comprising: a computer readable medium; first program instructions to receive user input as to whether unauthorized access or loss of data maintained or accessed by said application would cause substantial damage, whether said application is shared by different customers, and whether a vulnerability in said application can be exploited by a person or program which has not been authenticated to said application or a system in which said application runs; and second program instructions to assign a numerical value or weight to each of the foregoing determinations, each of said numerical values corresponding to a significance of the determination in evaluating said security risk, and combine the numerical values or weight to evaluate the security risk; and wherein said first and second program instructions are recorded on said medium.

DETAILED DESCRIPTION OF THE PREFERRED EMBODIMENTS

The present invention comprises several processes for evaluating different factors of and relating to an application which is being considered for deployment. These factors are the sensitivity of the data maintained or accessed by the application, the vulnerability caused by the application, the sensitivity of the customer of the application, and mitigation controls for the risk caused by the application. Each of the processes yields a numerical score. All the numerical scores are added together to form a combined score representing a security risk posed by the application in the environment and under the circumstances in which the application will be deployed. Then, the combined score is compared to the business needs and business value to determine whether the application should be deployed.

Figure 1:
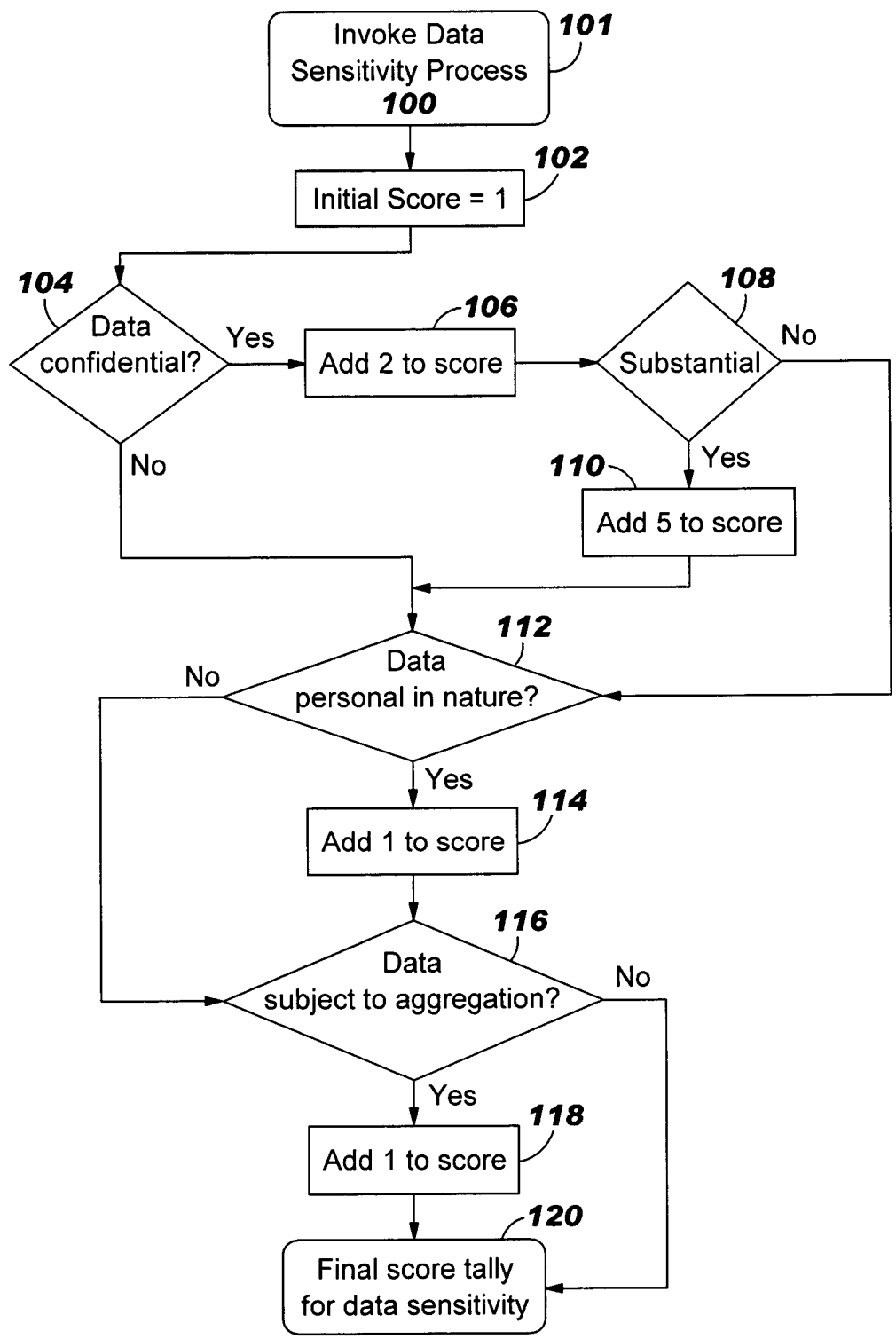
FIG. 1 is a flow chart illustrating a process according to the present invention for determining sensitivity of data maintained or accessed by an application being considered for deployment.

FIG. 1 illustrates a process 100 for evaluating sensitivity of data maintained or accessed by the application. The scope of this data is defined as that which resides on a same logical or virtual system where the application resides, or that data which the application is intended or expected to access. For example, if an application resides on a Linux host with IP address 192.168.1.1, and the application allows a user to query the user's account information on a data base manager back end which resides on IP address 192.168.1.1, then all data at IP address 192.168.1.1 is in scope. Also, all data managed by the database manager at IP address 192.168.1.1 is in scope. If there were other virtual machines at IP address 192.168.1.1, then only the data of the virtual host running the application would be in scope. The sensitivity of the data maintained or accessed by the application is that of the most sensitive data in the data scope. In the illustrated embodiment of the present invention, there are three levels of sensitivity—"confidential", "personal" and "aggregation". Before describing the steps of FIG. 1, these terms are defined as follows:

"Confidential" data is that which is proprietary to any customer, and if accessed by another party, deleted or corrupted, could result in damage to either the service provider or the customer. "Damage" includes loss of revenue, loss of market share, lawsuits by the customer's customers, loss of reputation or damage to investors. The data is considered "confidential" as long as the potential damage is significant.

"Personal" data is that which is personal to individuals such as social security numbers, credit cart numbers, bank account numbers, medical information and other information an individual has not put in the public domain. If personal data is accessed by another party, deleted or corrupted, there could be lawsuits from the individuals.

"Aggregation" data is that which could lead to confidential or personal data. In other words, if aggregation data is accessed by another party, the other party could derive information from the aggregation data that is confidential. For example, the other party might be able to piece together various problem tickets to learn that the service provider is about to down size. As another example, the other party might be able to piece together a collection of public documents about another company to learn that the customer is about to acquire this other company.

FIG. 1 is a flow chart of a manual process, or an automated process 100 performed by a computer program (with user input of the values), to determine the sensitivity value for the data. In step 101, the process 100 is invoked or begun. An initial value of "one" is set for the sensitivity value to reflect a minimum sensitivity and value of all data (step 102). Then, a determination is made whether any of the data in the data scope is confidential (decision 104). If so, the sensitivity value is increased by "two" (step 106). Then, a determination is made whether a theft, deletion or corruption of the data might cause a substantial damage (decision 108). A substantial damage can be defined as enough liability to warrant public disclosure, enough to affect overall corporation profitability or above 0.5% of business unit base revenue. If so, the sensitivity value is increase by "five" (step 110). After decision 104, no branch, decision 108, no branch or step 110, a determination is made whether any of the data in the data scope is personal in nature (decision 112). If so, the sensitivity value is increased by "one" (step 114). After decision 112, no branch or step 114, a determination is made whether any of the data in the data scope is subject to aggregation (decision 116). If so, the sensitivity value is increased by "one". After decision 118, no branch or step 118, the final sensitivity value results (step 120).

Figure 2:
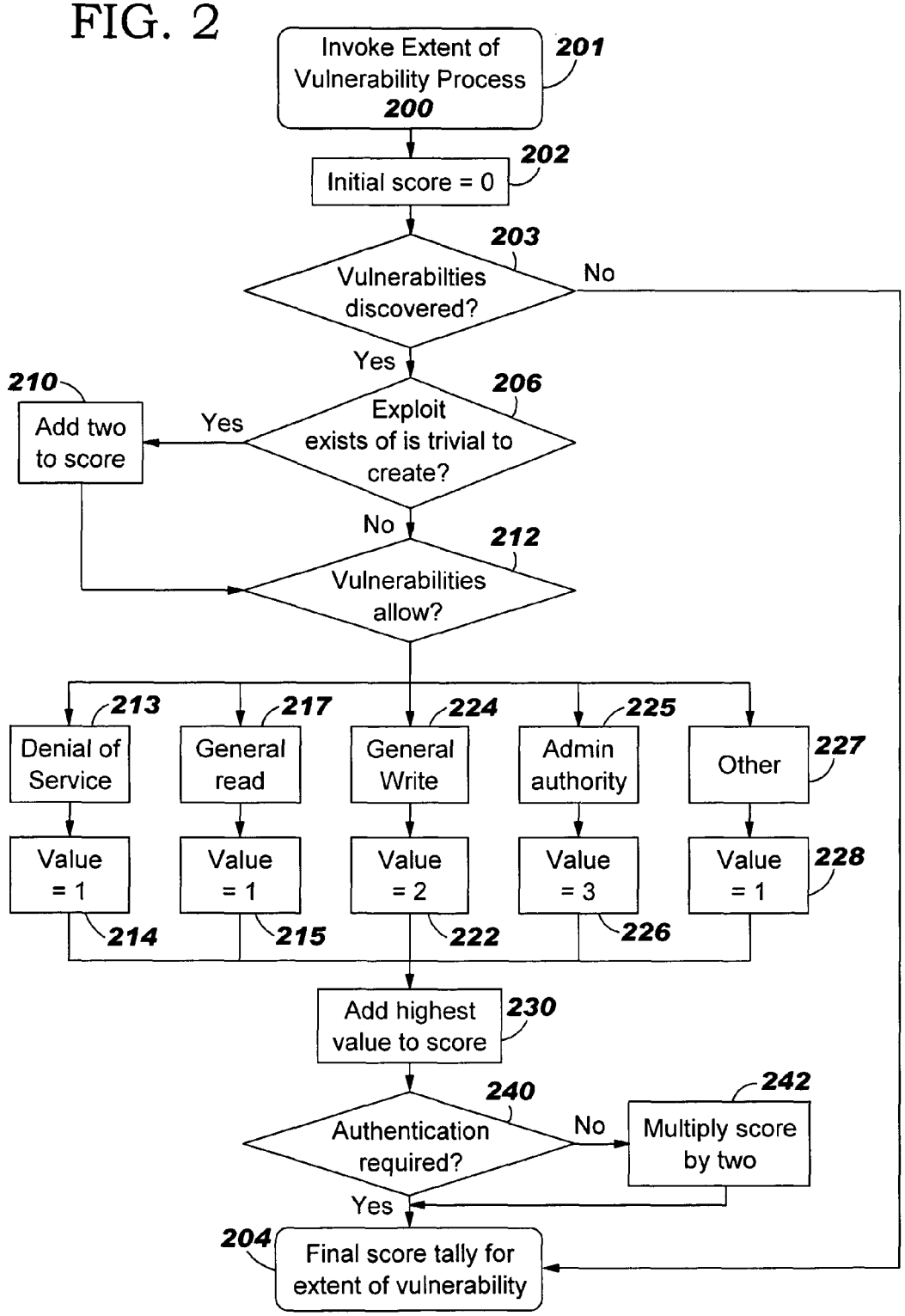
FIG. 2 is a flow chart illustrating a process according to the present invention for determining an extent of vulnerability caused by the application of FIG. 1.

FIG. 2 illustrates a process 200 for evaluating an extent of vulnerability caused by the application considered for deployment. Process 200 can be performed manually, or automatically by a computer program with user input. A "vulnerability" is a condition or property of the application that can lead to (a) third party access to data, (b) deletion or corruption of data, (c) administrative access to the application or system in which the application runs or is intended or expected to access, (d) shut down of the application, (e) shut down of the system in which the application is being run or which the application is intended or expected to access, authenticate, manage or monitor. Examples of vulnerabilities are as follows: buffer overflow, SQL injection and race conditions. The present invention considers not only the existence of a vulnerability, but the ease of exploitation of the vulnerability and the potential damage caused by the exploitation. The extent of vulnerability is limited to the system in which the application is run or the systems and data which the application is intended or expected to access.

In step 201, the process 200 is invoked or begun and in step 202, a vulnerability score is initialized to zero. Then, a determination is made whether there are any vulnerabilities in or created by the application considered for deployment (step 203). This determination is based on a security review of the application. The security review comprises a scan of all known error conditions as well as manual checks to attempt to manipulate programming and design errors in the application. If no vulnerabilities were found, then process 200 ends with the vulnerability score being "zero" (step 204). However, if a vulnerability was found (decision 202, yes branch), then a determination is made whether an exploit is currently known to exist or could easily be created (decision 206). Examples of types of known exploits are CERT Advisory CA-2001-19 "Code Red" CERT® Advisory CA-2003-12 Buffer Overflow in Sendmail and telnet vulnerabilities due to passwords being sent in clear text. An example of an exploit that does not currently exist but could easily be created is as follows. If the application will deny service when it is flooded with data packets, then there would be a nonexistent but easy to create exploit because a hacker could simply flood the application with data packets. If there is such an existing exploit or easy to create exploit, then a value of "two" is added to the vulnerability score (step 210). After decision 206, no branch or step 210, a determination is made as to what the vulnerability will allow (decision 212). The illustrated embodiment of process 200 divides the nature of the vulnerability into five categories, although it is possible to define other categories as well. If the vulnerability allows denial of service of the application, the system in which the application runs, or the system in which the application is intended or expected to access (decision 213), then the vulnerability score is increased by "one" (step 214). If the vulnerability allows read access to any data (decision 217), then the vulnerability score is increased by "one" (step 218). If the vulnerability allows write access to any data (decision 221), then the vulnerability score is increased by "two" (step 222). If the vulnerability allows a third party to have administrative authority to any data maintained or accessed by the application (decision 225), then the vulnerability score is increased by "three" (step 226). If the vulnerability has any other significant effect (decision 227), then the vulnerability score is increased by "one" (step 228). It is possible that a single vulnerability can encompass more than one of the foregoing categories. So, the highest value is chosen from those resulting from decisions 213, 217, 221, 225 or 227 to increase the vulnerability score (step 230). Next, a determination is made whether the vulnerability can be exploited by a person or program which has not been authenticated to the application or system in which the application runs (decision 240). This would increases the risk dramatically, so in such a case, the vulnerability score is doubled (step 242).

Figure 3:
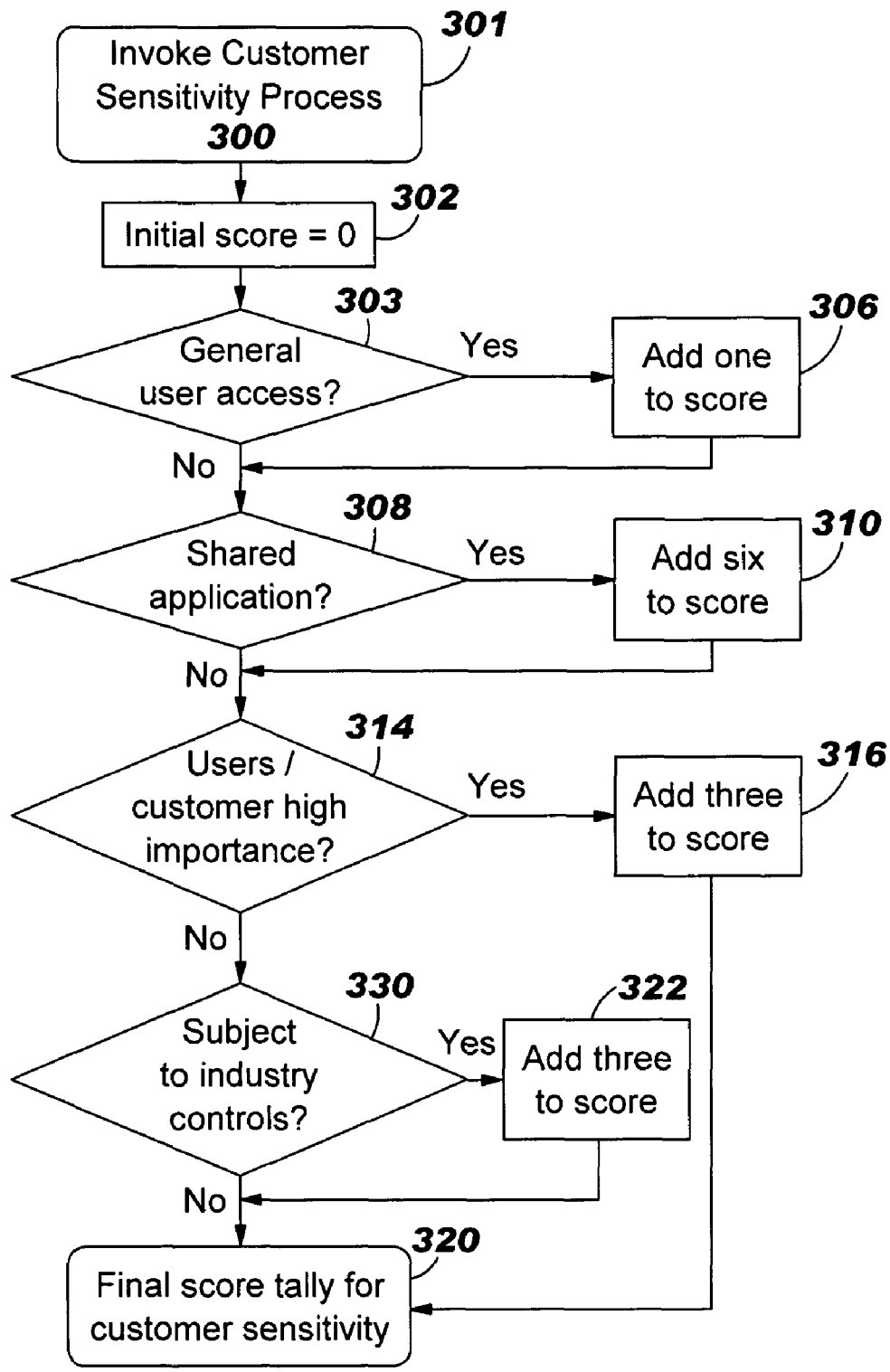
FIG. 3 is a flow chart illustrating a process according to the present invention for determining a sensitivity of a customer of the application of FIG. 1.

FIG. 3 illustrates a process 300 for evaluating an extent of sensitivity of the customer which uses the application or which the application serves. The sensitivity considers whether the application is accessible to the customer, or is hidden from the customer. For example, an application used by desk side support personnel of a service provider would have a lower sensitivity than an application used directly by a customer such as a website to submit problems to a service desk. The reason is that a failure of this application would cause a lesser burden on the customer and would have fewer people accessing it thereby lowering the probability of a malicious user accessing the application. As another example, an application used by a systems administrator to automate administration of a system would be hidden from the customer, and therefore have a lower sensitivity than an application used directly by a customer.

An application can be shared by more than one customer. The "sensitivity" also considers how many customers are using the application. An application used by more than one customer would have a higher sensitivity than an application used by only one customer, because it is more likely that one customer could improperly access the other customer's data (despite segregation of data and other security measures) or disrupt or overburden the application so that it cannot support the other customers.

The "sensitivity" also considers how important is the customer and whether the customer is subject to industrial or other external compliance controls or acting as a fiduciary for others. (There are often compliance controls in the financial or medical industry.) The importance of a customer can be measured by the dollar amount of business in absolute terms or in comparison to that of other customers, contracts or business partnerships. Officers of corporations, public accounting firms and investment firms are examples of people who act as fiduciaries for others.

In step 301, the process 300 is invoked or begun and in step 302, a customer sensitivity score is initialized to zero. Then, a determination is made whether at least one customer has direct access to the application (step 303). If so, a value of "one" is added to the score (step 306). Then (or if no customer has direct access to the application), a determination is made whether the application is shared by two or more customers (decision 308). If so, a value of "six" is added to the score (step 310). Then (or if the application is not shared), a determination is made whether any of the customers or users of the application have high importance (decision 314). If so, a value of "three" is added to the score (step 316), and this completes the scoring for customer sensitivity for this scenario (step 320). Referring again to decision 314, no branch, if none of the customers or users of the application have high importance, then a determination is made whether the application is subject to industrial or other external compliance controls (decision 330). If so, than a value of "three" is added to the score (step 332), and this completes the scoring for customer sensitivity in these scenarios (step 320).

Figure 4:
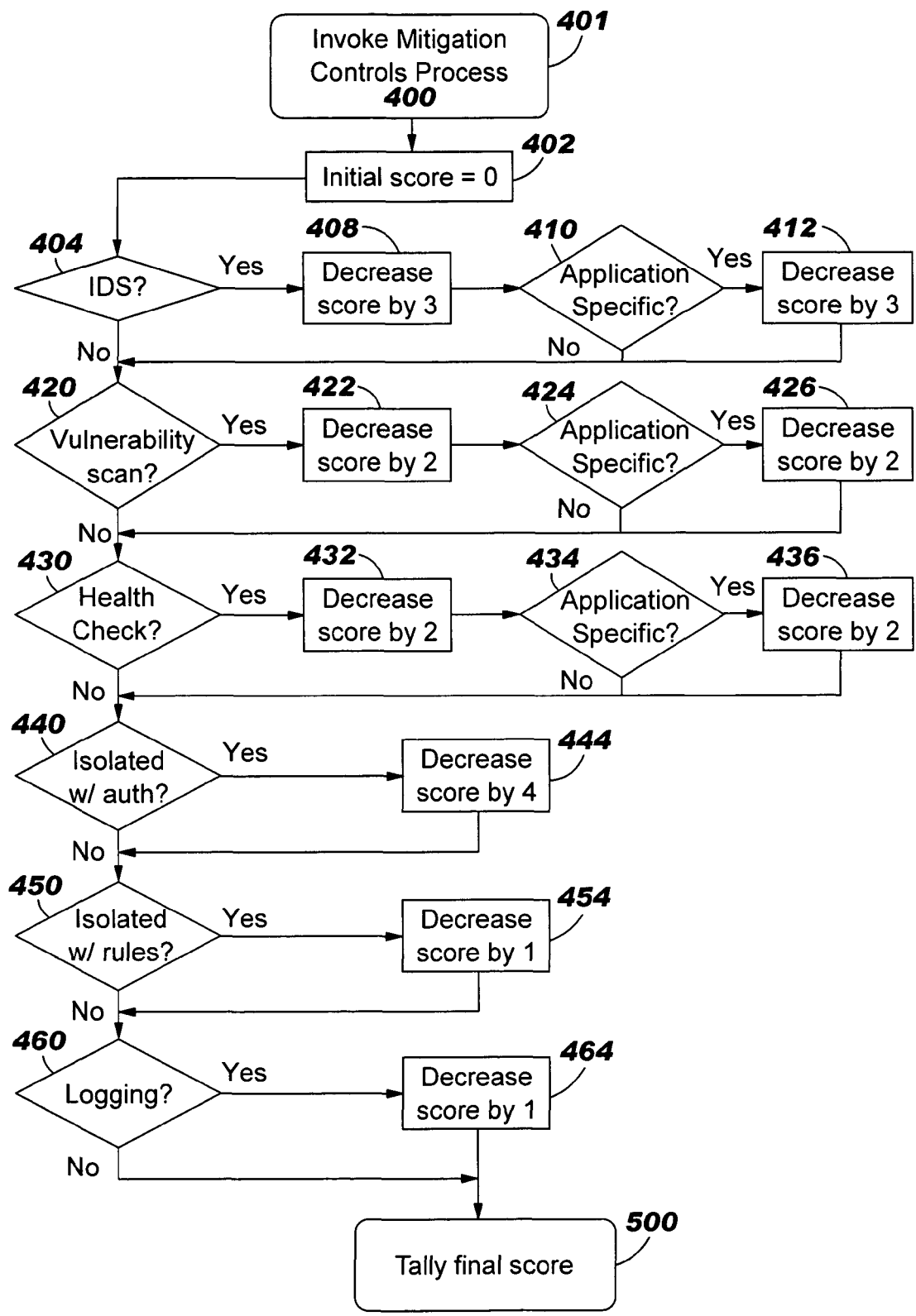
FIG. 4 is a flow chart illustrating a process according to the present invention for determining the level of assurance provided by mitigation controls for the application of FIG. 1.

FIG. 4 illustrates a process 400 for evaluating an extent of controls to reduce or mitigate vulnerability or its effect. The mitigation controls comprise intrusion detection, vulnerability scanning, health checking, network isolation and logging of exploits. An "intrusion detection" system searches each incoming message packet for known signatures of viruses and worms. Intrusion detection also comprises detection of known IT security attacks, alerting service providers of such attacks and potential blocking mechanisms to stop such attacks. Some intrusion detection systems are geared for an entire computer system and others for a specific application. An intrusion detection system geared for a specific application is usually more effective for the application than the more general intrusion detection system for the system because it will have specific attack signatures for that application whereas general intrusion detection systems may not. "Vulnerability scanning" comprises a series of procedures performed on a system or an application to determine if the system or application is susceptible to known vulnerabilities. These procedures include port discovery, enumeration and testing and reporting of discovered vulnerabilities. These procedures can be performed manually or automatically. Generally, the automatic procedure is more comprehensive and less prone to errors than the manual process. Generally, a vulnerability scan for a specific application is more effective for the application than the more general vulnerability scan for the system. "Health checking" comprises an assessment of whether a system or application complies with a specific security policy. This assessment comprises configuration discovery, comparison of configuration to policy and reporting of policy violations to the service provider. These procedures can be performed manually or automatically. Generally, the automatic procedure is more comprehensive and less prone to errors. Generally, a health check for a specific application is more effective for the application than the more general health check for the system. "Strong" network isolation means that the application's host is physically isolated or "segmented" from other hosts (to prevent communication between the two hosts) with strong authentication required to connect to other hosts. "Strong" authentication may require a userID and password or something equivalent. "Weak" authentication may be based on network flow control rules such as source IP address only. This will decrease the chance that a problem with an application on one host will propagate to other hosts. Lesser network isolation occurs when the application is separated from other vital hosts based on effective network flow controls or rules. "Logging" means that the application logs all malicious activity which is detected or suspected. This log can be used for subsequent intrusion analysis, and if an intrusion is confirmed, to create and install a safeguard for a subsequent intrusion of this type.

In step 401, the process 400 is invoked or begun and in step 402, a mitigation control score is initialized to zero. Then, a determination is made whether a high quality, round the clock, intrusion detection system ("IDS") is in use for the application or the system on which the application runs (decision 404). If so, a value of "three" is subtracted from the initial mitigation control score (step 408). Then, a determination is made whether the intrusion detection system is specific to the application (decision 410). If so, another value of "three" is subtracted from the mitigation control score (step 412). After decision 404, no branch, decision 410, no branch, or step 412, a determination is made whether high quality, automated, periodic vulnerability scanning is performed for the application or the system on which the application runs (decision 420). If so, a value of "two" is subtracted from the mitigation control score (step 422). Then, a determination is made whether the vulnerability scanning is specific to the application (decision 424). If so, another value of "two" is subtracted from the mitigation control score (step 426). After decision 420, no branch, decision 424, no branch, or step 426, a determination is made whether high quality, automated, periodic health checking is performed for the application or the system on which the application runs (decision 430). If so, a value of "two" is subtracted from the mitigation control score (step 422). Then, a determination is made whether the health checking is specific to the application (decision 434). If so, another value of "two" is subtracted from the mitigation control score (step 436). After decision 430, no branch or decision 434, no branch, or step 436, a determination is made whether there is "strong" network isolation (decision 440). If so, a value of "four" is subtracted from the mitigation control score (step 444). After decision 440, no branch or step 444, a determination is made whether there is some but not "strong"

network isolation (decision 450). If so, a value of "one" is subtracted from the mitigation control score (step 454). After decision 450, no branch or step 454, a determination is made whether the application logs malicious activity which is detected or suspected (decision 460). If so, a value of "one" is subtracted from the mitigation control score (step 464). Then, all the scores generated by processes 100, 200, 300 and 400 are added together to arrive at the final score for the application (step 500). (The foregoing are just examples of scores that can be used for the various factors; other scores can be used as well.)

The final score can be used as described below to determine the risk/benefit associated with the application. First, in the illustrated example, the score is classified into a risk category as follows. If the final score is less than or equal to zero, then there is virtually no risk. If the final score is between one and ten, then the risk is low. If the final score is between eleven and twenty, then the risk is medium. If the final score is above twenty, then the risk is high.

Next, the risk level is compared to the benefit of the application, such as cost savings and revenue gained by the application, to determine whether to certify the application for deployment, as indicated by the following table:

| Savings | High Revenue | Medium Revenue | Low Revenue |
|---------|--------------|----------------|-------------|
| High | No Risk = Certify | No Risk = Certify | No Risk = Certify |
| High | Low Risk = Certify | Low Risk = Certify | Low Risk = Certify |
| High | Medium Risk = *Certify | Medium Risk = *Certify | Medium Risk = Mitigate |
| High | High Risk = Mitigate | High Risk = Mitigate | High Risk = Mitigate |
| Med. | No Risk = Certify | No Risk = Certify | No Risk = Certify |
| Med. | Low Risk = Certify | Low Risk = Certify | Low Risk = Certify |
| Med. | Medium Risk = *Certify | Medium Risk = Mitigate | Medium Risk = Mitigate |
| Med. | High Risk = Mitigate | High Risk = Mitigate | High Risk = Reject |
| Low | No Risk = Certify | No Risk = Certify | No Risk = Certify |
| Low | Low Risk = Certify | Low Risk = Certify | Low Risk = Mitigate |
| Low | Medium Risk = *Certify | Medium Risk = Mitigate | Medium Risk = Reject |
| Low | High Risk = Mitigate | High Risk = Reject | High Risk = Reject |

Note that "*Certify" means that this certification is contingent upon use of additional or more comprehensive risk mitigation processes such as implementation of intrusion detection, additional network segmentation or limitation of user access to application.

Based on the foregoing, a system, method and program product for determining whether to certify an application for deployment has been disclosed. However, numerous modifications and substitutions can be made without deviating from the scope of the present invention. For example, the values added and subtracted in the different processes can be modified, and additional or fewer factors can be considered in these processes. For example, the following, additional factors can be considered: current customer satisfaction in the customer sensitivity process, types of users supported in the customer sensitivity process, development standards followed for application in the mitigation process and complexity of application such as lines of code in the extent of vulnerability process.

The invention claimed is:

1. A computer program product for evaluating a security risk of an application, the computer program product comprising:
   one or more computer-readable tangible storage devices and program instructions stored on at least one of the one or more storage devices, the program instructions comprising;
   program instructions to determine whether employees of two or more customer corporations are authorized to concurrently share use of the application;
   program instructions to determine whether a vulnerability in the application can be exploited by a user which has not been authenticated to the application;
   program instructions to determine whether there is a requirement for authentication for user access to the application;
   program instructions to assign numerical weights to the respective determinations, each of the numerical weights corresponding to a significance of the respective determination in quantifying the security risk;
   program instructions to combine the numerical weights to quantify the security risk; and
   program instructions to compare the quantification of the security risk based on the combined numerical weights to a monetary value of a benefit of the application, and based on the comparison, recommend whether to certify the application for use.

2. The computer program product of claim 1 further comprising:
   program instructions, stored on at least one of the one or more storage devices, to determine whether a third party can obtain unauthorized administrative authority to data maintained by the application; and
   program instructions, stored on at least one of the one or more storage devices, to determine whether a third party can obtain unauthorized read and/or write access to data maintained by the application; and wherein
   the program instructions to assign numerical weights to the respective determinations assign a numerical weight to the determination whether a third party can have unauthorized administrative authority to data maintained by said application, and assign a numerical weight to the determination whether a third party can have unauthorized read and/or write access to data maintained by said application; and
   the program instructions to combine the numerical weights to quantify the security risk also use the numerical weight for the determinations whether a third party can have unauthorized administrative authority to data maintained by said application and the numerical weight for the determination whether a third party can have unauthorized read and/or write access to the data, in quantifying the security risk.

3. The computer program product of claim 1 further comprising:
   program instructions, stored on at least one of the one or more storage devices, to determine whether data accessible by a user via the application is confidential;

the program instructions to assign numerical weights to the respective determinations assign a numerical weight to the determination whether data accessible by a user via the application is confidential; and the program instructions to combine the numerical weights to quantify the security risk also use the numerical weight for the determinations whether data accessible by a user via the application is confidential.

4. The computer program product of claim 1 wherein the monetary value of the benefit of the application is a cost savings due to use of the application.

5. The computer program product of claim 1 wherein the monetary value of the benefit of the application is a revenue gained by the application.

6. A system for evaluating a security risk of an application, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine whether employees of two or more customer corporations are authorized to concurrently share use of the application;

program instructions to determine whether a vulnerability in the application can be exploited by a user which has not been authenticated to the application;

program instructions to determine whether there is a requirement for authentication for user access to the application;

program instructions to assign numerical weights to the respective determinations, each of the numerical weights corresponding to a significance of the respective determination in quantifying the security risk;

program instructions to combine the numerical weights to quantify the security risk; and program instructions to compare the quantification of the security risk based on the combined numerical weights to a monetary value of a benefit of the application, and based on the comparison, recommend whether to certify the application for use.

7. The computer system of claim 6 further comprising:

program instructions, stored on at least one of the one or more storage devices for execution by at least one of the one or more processors via at least one of the one or more memories, to determine whether a third party can obtain unauthorized administrative authority to data maintained by the application; and program instructions, stored on at least one of the one or more storage devices for execution by at least one of the one or more processors via at least one of the one or more memories, to determine whether a third party can obtain unauthorized read and/or write access to data maintained by the application; and wherein the program instructions to assign numerical weights to the respective determinations assign a numerical weight to the determination whether a third party can have unauthorized administrative authority to data maintained by said application, and assign a numerical weight to the determination whether a third party can have unauthorized read and/or write access to data maintained by said application; and the program instructions to combine the numerical weights to quantify the security risk also use the numerical weight for the determinations whether a third party can have unauthorized administrative authority to data maintained by said application and the numerical weight for the determination whether a third party can have unauthorized read and/or write access to the data, in quantifying the security risk.

8. The computer system of claim 6 further comprising:

program instructions, stored on at least one of the one or more storage devices for execution by at least one of the one or more processors via at least one of the one or more memories, to determine whether data accessible by a user via the application is confidential;

the program instructions to assign numerical weights to the respective determinations assign a numerical weight to the determination whether data accessible by a user via the application is confidential; and the program instructions to combine the numerical weights to quantify the security risk also use the numerical weight for the determinations whether data accessible by a user via the application is confidential.

9. The computer system of claim 6 wherein the monetary value of the benefit of the application is a cost savings due to use of the application.

10. The computer system of claim 6 wherein the monetary value of the benefit of the application is a revenue gained by the application.

* * * * *